Figure 1:
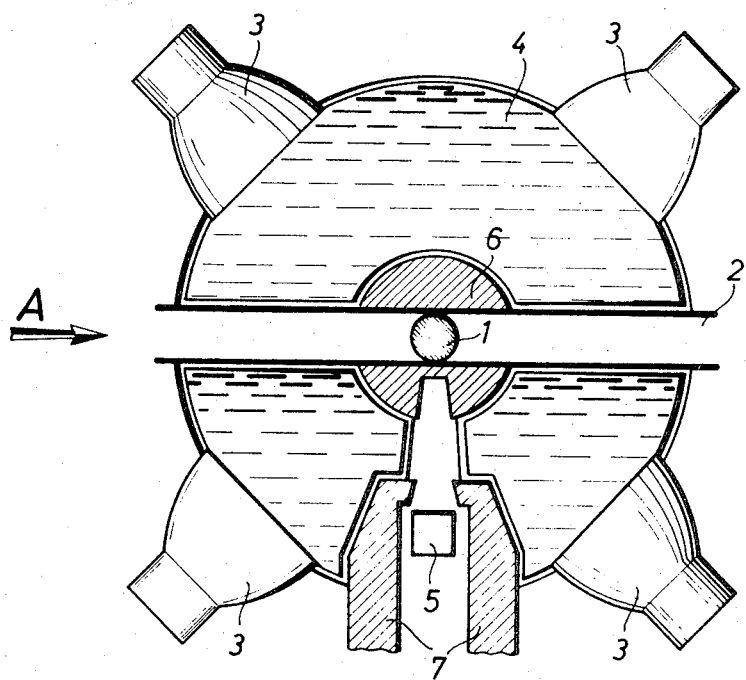

United States Patent [19]
Michaelis

[11] 3,796,875
[45] Mar. 12, 1974

[54] METHOD AND APPARATUS FOR THE NON-DESTRUCTIVE ANALYSIS OF NUCLEAR FUELS

[75] Inventor: Walfried Friedrich Arthur Michaelis, Karlsruhe, Germany

[73] Assignee: Gesellschaft Fur Kernforschung MbH, Karlsruhe, Webeustrasse, Germany

[22] Filed: Aug. 18, 1971

[21] Appl. No.: 172,810

Related U.S. Application Data
[63] Continuation-in-part of Ser. No. 750,547, Aug. 6, 1968, abandoned.

[30] Foreign Application Priority Data
Aug. 25, 1967 Germany............................. 5096442

[52] U.S. Cl. ................................ 250/363, 250/366
[51] Int. Cl. ............................................ G01j 39/18
[58] Field of Search ...... 250/83 SA, 106 SC, 71.5 R

[56] References Cited
UNITED STATES PATENTS
3,018,374  1/1962  Pritchett ...................... 250/83.5 A
2,597,535  5/1952  Segre ........................... 250/106 SC
3,388,254  6/1968  Haller et al. .................. 250/71.5 R
3,636,353  1/1972  Untermyer..................... 250/83.3 D
3,389,254  6/1968  Russell........................... 250/71.5 R
2,739,242  3/1956  Armistead...................... 250/71.5 R
2,989,635  6/1961  Scherbatskoy................. 250/71.5 R Primary Examiner—James W. Lawrence
Assistant Examiner—Harold A. Dixon
Attorney, Agent, or Firm—Burgess, Dinklage & Sprung

[57] ABSTRACT

A process and apparatus for analyzing a nuclear fuel body by placing such in a channel surrounded by a liquid scintillator with a channel therein in which the body resides, irradiating the body through the channel with low-energy neutrons whereby releasing fast neutrons ($n_s$) and prompt gamma pulses ($\gamma$); measuring the fast neutrons and prompt gamma pulses so emitted by means of detectors and photomultipliers surrounding the irradiated body; and subtracting the $n_s$, $\gamma$ coincidences from said gamma pulses, whereby evaluating and analyzing said body.

7 Claims, 3 Drawing Figures

METHOD AND APPARATUS FOR THE NON-DESTRUCTIVE ANALYSIS OF NUCLEAR FUELS

This application is a continuation in part of Application Ser. No. 750,547, filed Aug. 6, 1968 now abandoned.

To prevent the abuse of nuclear fuels such as uranium 235 and plutonium 239, these materials are subject to rigorous controls. Presently, this means that the operators of nuclear facilities grant the inspectors unlimited access to all technical, operating facilities and have to communicate even insignificant details of the fabrication process. This inspection system is an interference in the autonomy of the operator and does not exclude the possibility of industrial espionage.

The invention has the purpose of creating a system of control which is based on a non-destructive analysis of the nuclear fuel and can be applied at some strategically important points of the material flow, such as the inputs and outputs of the fabrication plants and nuclear reactors, respectively.

The method elaborated to solve this problem proposes to irradiate the bodies containing the nuclear fuels, e.g., nuclear fuel elements, with low energy neutrons in the familiar way to detect the fast neutrons ($n_s$) released by the nuclear fissions and, in addition, measure the prompt gamma pulses and, for the evaluation from these pulses to subtract the ($n_s$, $\gamma$) coincidences. It is advantageous to irradiate the nuclear fuels to be analyzed with a monoenergetic collimated neutron beam which may be obtained in the easiest way, e.g., on a test reactor where the Bragg-reflection on a single crystal (such as lead) is used.

If one irradiates a sample to be investigated with thermal or approximately thermal neutrons, some of these neutrons will be captured in the sample corresponding to the individual cross-sections. The compound nuclei produced are excited with the respective binding energy which is between 4 and 11 McV. It is released promptly in the form of a characteristic gamma radiation, either by a direct transition to the ground state or by two or multistage cascades. De-excitation occurs preferably by dipole radiation. Since the level density in the lower excitation range of the atomic nuclei is low and, in addition, only some of the states meet the parity and spin moment criteria for electric dipole radiation from the capture state, the ($n$, $\gamma$) spectrum has a very simple structure in the upper energy range, although in the whole spectrum modern tools will be able to detect 100 or more gamma transitions per nuclide. If there is an isotopic mixture, it is useful therefore to use the upper energy range for analysis. The individual isotopes in this case are identified by the energy of the observed transitions; the line intensity is a measure of the number of nuclei of the respective nuclide present in the sample. The analysis of high energy gamma radiation does not entail any difficulties when semiconductor counters are used. Lithium-drafted germanium detectors, for instance, are superior to all the other spectrometers presently known with respect to energy resolution and response probability.

Hence, this prompt gamma radiation in many cases can be used for a very accurate and quantitative analysis of the sample so irradiated.

The major advantage to be gained out of the invention is the fact that the method suggested makes it possible now to use this prompt gamma radiation also for the accurate analysis of nuclear fuels. This was not possible until now, because the fission cross-sections of, e.g., U 235, Pu 239, Pu 241 are higher than the ($n$, $\gamma$) cross-sections so that the structure of the gamma spectrum for uranium and plutonium is determined essentially by the fission spectrum. While, up to now, it was attempted to use the effects due to nuclear fission for a detection process, the invention goes in the opposite direction, i.e., it largely suppresses this fission spectrum for evaluation or, with a suitable method of measurement, practically eliminates it completely.

The most significant single advantages of the invention can be summarized as follows:

a. The individual nuclides that can possibly be used show very sharp characteristic transitions with a small line density;

b. it is possible to detect accurately all isotopes of uranium as well as plutonium;

c. by suitable choice of the neutron energy it is possible to achieve a sufficient transparency of the method of measurement; the absorption of the high energy capture radiation is very low (15 to 20 barn/atom);

d. uncertainties due to alloying constituents are practically excluded. Possible additives to the fuel can be detected in many cases. The fuel element cladding material has practically no influence on the analysis;

e. the gamma source strength is independent of the halflives and is determined only by the cross-sections and the isotopic content with a given neutron intensity; the capture cross-sections of the most important nuclides are of the same order of magnitude; the relatively low capture cross-section of U 238 has a favorable influence in the analysis of weakly enriched fuels;

f. it is possible to achieve high and well measurable gamma source strengths.

A measurement assembly for the execution of the method under the invention is explained in greater detail on the basis of a schematic diagram (FIG. 1).

In the center of the assembly a collimated neutron beam (arrow A) hits the fuel element 1 to be investigated which has been introduced in a plane normal to the plane of the drawing. A neutron shield (e.g., of Li 6 in the form of a hydride or carbonate), with which channel 2 for the low energy neutrons is cladded, prevents the penetration of primary or scattered slow neutrons into the neutron detector 3, 4 and the gamma counter 5. The fast neutrons $n_f$, which are due to the nuclear fission, are detected in a 4 $\pi$ geometry, whereas the prefiltered gamma pulses are collimated and measured essentially normal to the axis of channel 2. For this purpose a lead shield 6 and a liquid scintillator 4 are arranged around the measuring zone of the fuel element 1 in spherical symmetry. At the outer circumference of the scintillator tank there are various photo multipliers 3 which are connected in anti-coincidence to the gamma counter 5 with respect to the evaluating instrument.

Figure 3:
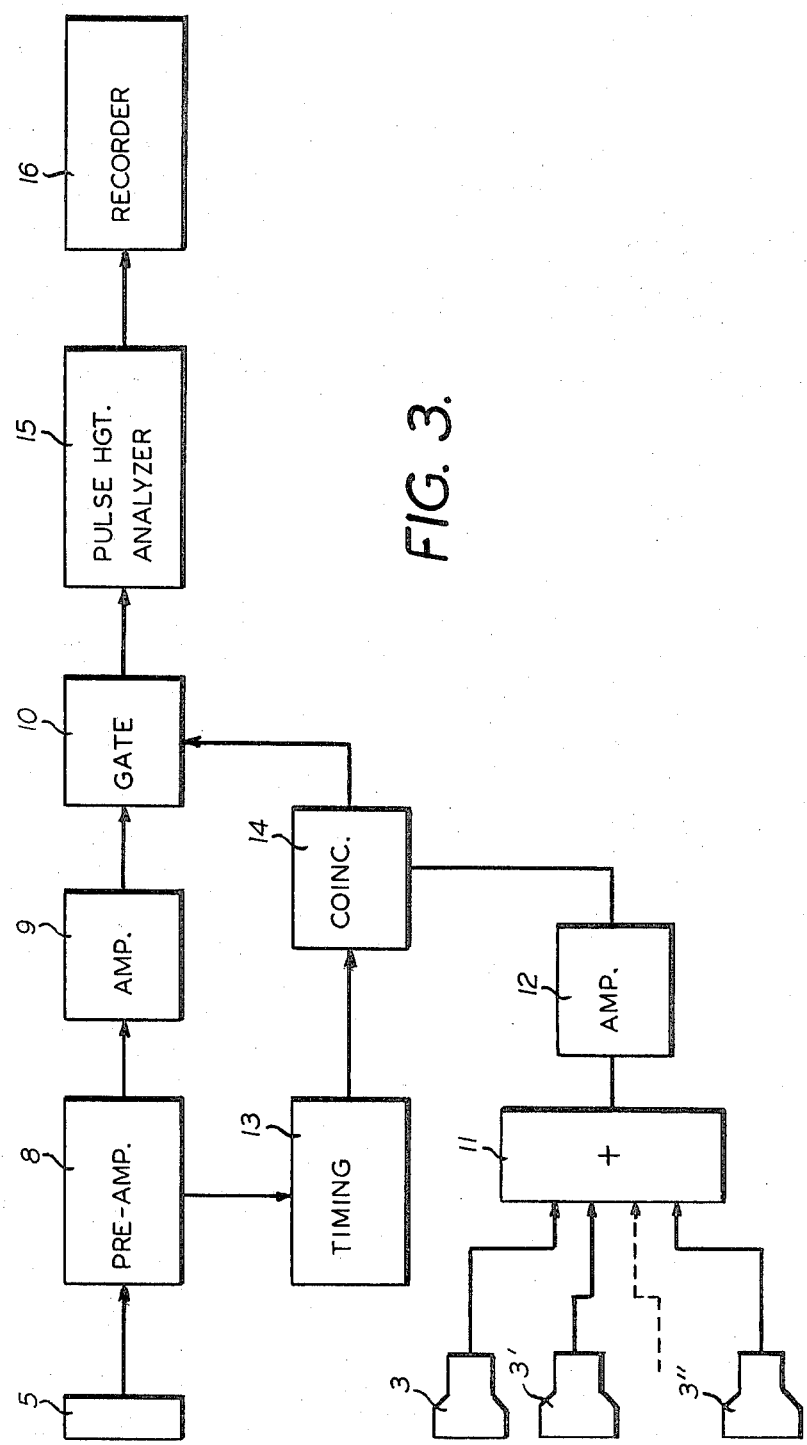

If a fission event occurs in the sample, fast neutrons are detected in the neutron detector 4. Accordingly, not only a detector output from the gamma-ray detector 5 is directed to the anti-coincidence gate 10 (see FIG. 3) but at the same time at least one of the photomultipliers 3, 3' or 3'' connected to the neutron counter produces an output pulse which passes through the summing circuit 11, the amplifier 12 and the coincidence circuit 14 to the anti-coincidence gate 10. The timing signal associated with the detection of a gamma quantum in detector 5 is produced with the timing unit 13. If the coincidence circuit 14 is triggered, the gate 10 is closed to cut off the input to the pulse height analyzer 15 thereby eliminating the detection of gamma quanta associated with fission events.

The gamma counter 5 is shielded by a lead body 7 on the side and thus receives mainly the filtered gamma radiation from fuel element 1. The, e.g., monoenergetic neutrons in the lower energy range of interest here can be taken from a test reactor, a neutron generator, or any other suitable neutron source in the familiar way. The requirements as to energy homogeneity are not high.

For the better understanding of the invention some quantitative data are given below:

The most important data for the uranium and plutonium isotopes are compiled in the table.

1. The characteristic gamma transistions of the highest energy are in the energy range between 4 and 6.5 MeV. With a positive parity of the compound state the maximum energy electric dipole transition results in octupole oscillation bands of the product nucleus. For negative parity the E1 radiation to the ground state rotational band must be expected.

Figure 2:
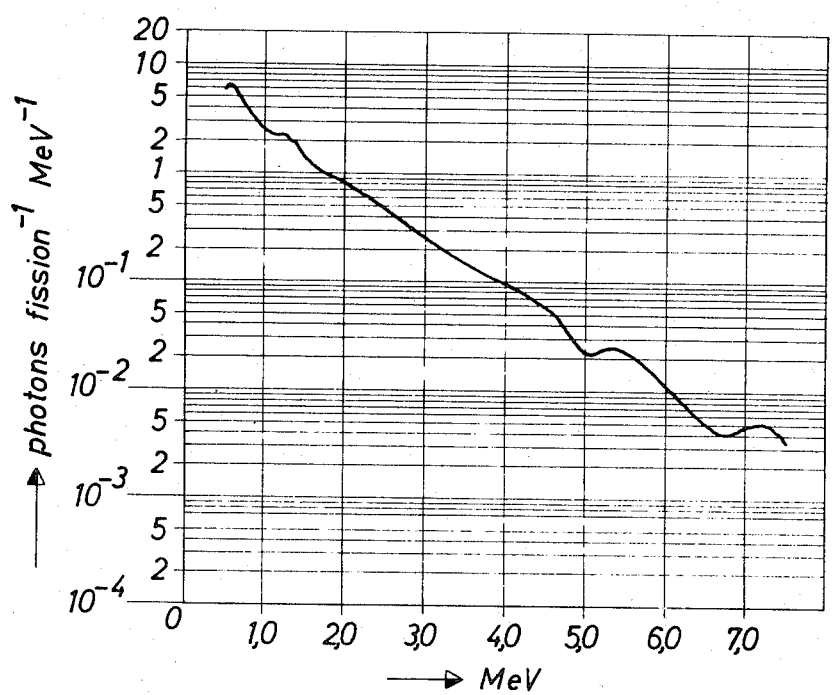

2. For these energies, according to FIG. 2[7,8], the number of photons per MeV and fission process is between $10^{-1}$ and $5 \times 10^{-3}$.

3. If the neutron energy is increased from thermal values to about 0.1 eV, the transparency is increased not only through the reduction of the cross-sections, but it may have a favorable influence also on the ratio $\sigma_{n\gamma}/\sigma_{nf}$.

For the counting rates and measurement periods to be expected for instance a fuel element plate consisting of 15% $Pu^{239}O_2$ and 85% $U^{238}O_2$ is used as the basis. Let the thickness of the plate be 6 mm. The theoretical density of the oxide mixture is 11.2 g cm$^{-3}$. The value obtained in practice is around 85%. Let the available neutron flux be $10^7$ n cm$^{-2}$ sec$^{-1}$ and the neutron energy be 0.1 eV. If 10 cm$^2$ of the fuel element plate are irradiated, $N_o = 10^8$ neutrons will hit the plate per second. Of this number $$N = N_o (1 - e^{-\Sigma_a d})$$

neutrons are absorbed. In this, $\Sigma_a = \Sigma_a^{239} + \Sigma_a^{238}$ is the total macroscopic absorption cross-section and d the thickness of the plate. The influence of oxygen can be neglected. From the Table the result is:

$$\Sigma_a^{239} = 2.226 \text{ cm}^{-1}$$

$$\Sigma_a^{238} = 0.036 \text{ cm}^{-1}$$

and $$N = 7.42 \times 10^7 \text{ sec}^{-1}$$

The number of fissions is calculated to be $$N_f = (\Sigma_f^{239}/a) N,$$

if $\Sigma_f^{239}$ is the macroscopic cross-section for $Pu^{239}$. One receives $$\overline{N_f = 4.70 \times 10^7 \text{ sec}^{-1}}$$

For the (n, γ) processes it holds that $$N_{n\gamma}^{239} = (\Sigma_{n\gamma}^{239}/\Sigma_a) N$$

and $$N_{n\gamma}^{238} = (\Sigma_{n\gamma}^{238}/\Sigma_a) N$$

From the table it follows that $$N_{n\gamma}^{239} = 2.61 \times 10^7 \text{ sec}^{-1}$$

and $$N_{n\gamma}^{238} = 1.19 \times 10^6 \text{ sec}^{-1}$$

The total of primary transitions from the capture state is distributed over an energy range of a maximum of 6.5 MeV so that at least 0.05 photons per MeV and capture process are emitted in the measuring range. The number of transitions that can be utilized in this way is $$(N_{n\gamma}^{239})' = 1.31 \times 10^6 \text{ sec}^{-1} \text{ MeV}^{-1}$$

and $$(N_{n\gamma}^{238})' = 5.95 \times 10^4 \text{ sec}^{-1} \text{ MeV}^{-1}$$

TABLE

Neutron Capture in Uranium and Plutonium Isotopes[a]

| Isotope | Thermal neutrons[b] | | | Ψ | $E_B$ | $J_r$ | $J_c$ | $J_p$ | $E_a$ | $J_a$ | $E_n = 0.1$ eV | | |
|---|---|---|---|---|---|---|---|---|---|---|---|---|---|
| | $\sigma_{n\gamma}$ | $\sigma_{nf}$ | $\sigma_{n\gamma}/\sigma_{nf}$ | | | | | | | | $\sigma_{n\gamma}$ | $\sigma_{nf}$ | $\sigma_{n\gamma}/\sigma_{nf}$ |
| | [barn] | [barn] | | | [kev][c] | | | | [kev] | | [barn] | [barn] | |
| $U^{233}$ | 49.4 | 525.9 | 0.094 | 2.51 | 6783 | 3/2+ | | 0+ | | | | | |
| $U^{234}$ | 95 | — | ∞ | — | 5267 | 0+ | ½+ | 7/2− | | | | | |
| $U^{235}$ | 100.9 | 578.3 | 0.175 | 2.44 | 6467 | 7/2− | (4−) | 0+ | 150 | 4+ | 50 | 250 | 0.17 |
| $U^{236}$ | 6 | — | ∞ | — | 5304 | 0+ | ½+ | (½+) | | | | | |
| $U^{238}$ | 2.73 | — | ∞ | — | 4784 | 0+ | ½+ | | | | ~2 | — | ∞ |
| $Pu^{239}$ | 265.8 | 743.1 | 0.358 | 2.88 | 6455 | ½+ | (1+) | 0+ | 597 | (1−) | 250 | 450 | 0.6[d] |
| $Pu^{240}$ | 250 | <0.1 | >2500 | | 5412 | 0+ | ½+ | 5/2+ | | | 150 | | |
| $Pu^{241}$ | 425 | 950 | (0.39) | 3.00 | 6219 | 5/2+ | | 0+ | | | 300 | 600 | 0.5 |
| $Pu^{242}$ | 19 | <0.2 | >95 | | 5047 | 0+ | ½+ | | | | | | |

[a] In the Table the symbols have this meaning:
$\sigma_{n\gamma}$ = cross-section for the (n,γ) reaction
$\sigma_{nf}$ = fission cross-section
Ψ = fission neutron per fission
$E_B$ = binding energy of the neutron
$J_r, J_c, J_p$ = spin of the target nucleus, the compound nucleus, and the product nucleus in the ground state
$E_a, J_a$ = excitation energy and spin, respectively, of the first state which can be populated by E1 radiation
[b] See [10], [11], [12]
[c] See system of the heavy elements [13]
[d] See [11]

If the solid angle for the gamma detector is $2 \times 10^{-3}$, per sec and MeV $$(N_{n\gamma}{}^{239})_{det} = 2.62 \times 10^3 \text{ sec}^{-1} \text{ MeV}^{-1}$$

and $$(N_{n\gamma}{}^{238})_{det} = 1.19 \times 10^2 \text{ sec}^{-1} \text{ MeV}^{-1}$$

respectively, hit the detector.

If a lithium drifted germanium detector is used as a high-resolution detector, the second pair line is used for spectroscopy. For a counter with 12 mm field area the probability of the incident gamma quantum being absorbed through a pair effect, the positron-electron pair loosing its entire energy in the counter and both annihilation quanta leaving the detector is some [14] $1.5 \times 10^{-2}$ in the energy range between 4 and 6.5 MeV. Hence, the peak counting rates are roughly $$(N_{n\gamma}{}^{239})_{peak} = 40 \text{ sec}^{-1} \text{ MeV}^{-1}$$

and $$(N_{n\gamma}{}^{238})_{peak} = 2 \text{ sec}^{-1} \text{ MeV}^{-1}$$

For a statistical accuracy of 1 percent this results in measuring periods of about 5 minutes for Pu 239
about 100 minutes for U 238

So measuring periods of the order of 1 h can certainly be realized. Optimization of the counter and the use of two or more detectors in conjunction with modern data processing equipment may even contribute to a reduction of these periods. An important limitation to the geometry is the maximum permissible counting rate in the detector with a given resolution. If a multiplicity of 4 is assumed for the radiation capture and if it is taken into account that in fission on the average some 9 gamma quanta are emitted, some $10^6$ photons per sec hit the detector according to the above calculation. A considerable fraction of these quanta has low energies and can be filtered off by a few mm of lead. Yet, overall counting rates of $10^5$ cps or more must be expected. Counting rate effects are due mainly to the electronic systems. Present techniques (pole zero compensation, anti-pile-up discriminators, gate method) enable the processing of counting rates of up to $10^5$ cps without serious deterioration of the energy resolution [15].

Special importance is attached to estimating the disturbance effect due to the prompt fission spectrum. According to FIG. 2 the number of photons per MeV and fission between 4 and 5 MeV is around 0.05 on the average. If it is assumed that anti-coincidence reduces the fission spectrum by a factor of 20, in our example it holds that $$(N_{n\gamma}{}^{total})_{det}/(N_f)_{det} \geq [(2.73 \times 10^7)(5 \times 10^{-2})/(4.70 \times 10^7)(5 \times 10^{-2})] \times 20 \approx 12$$

Since the useful counting rate is concentrated in a few peaks, such ratio enables a safe analysis of the radioactive captures for any possible structure of the fission spectrum.

For the anti-coincidence shield for the fission neutrons it is best to use a liquid organic scintillator. Because a prompt signal is required, the detection cannot be carried out through slowing down of the neutrons with successive absorption in the boron. Rather, it is necessary to count the recoil protons directly. The light yield should be as high as possible (78 – 80 percent anthra-cene), in order to safeguard a low response threshold. Suitable substances are commercially available (e.g. NE 213 or NE 224) or may be composed in the user's laboratory. For the detection probability use can be made of the fact that per fission process at least 2.5 neutrons are released on the average. This means that a detection probability of around 70 percent for the single neutron is sufficient to detect a fission event with 95 percent probability. The theoretical response probability is calculated approximately as follows:

$$W = (1 - e^{-(L \cdot \rho/M) n \sigma_s d})$$

with $L$ = Avogadro number
$\rho$ = density of the scintillator
$M$ = molecular weight
$n$ = number of hydrogen atoms per molecule
$\sigma_s$ = scattering cross-section for hydrogen
$d$ = thickness of scintillator For pseudocumol (1, 2, 4-trimethyl benzene) is $\rho = 0.88$ g cm$^{-3}$, $M = 120.2$, $n = 12$. The average energy of the fission neutrons is about 1.8 MeV. The scattering cross-section for hydrogen at this energy is 3 barn. At a thickness of 15 cm thus a theoretical response probability of some 90 percent is obtained. This does not take into account counting losses through the finite response threshold. For this threshold values of some 50 keV can be realized. A detection probability of 70 percent thus can be safely attained. The reduction of the fission spectrum by a factor of 20 as mentioned above can be reached in this way without any difficulties.

If the high-energy transitions from the capture state do not directly lead to the ground state, they occur in coincidence to low-energy photons. To prevent these gamma quanta from activating any anticoincidence, the neutron detector must be shielded by a few cm of lead. For 500 keV radiation some 4.2 cm are sufficient to achieve an attenuation by two orders of magnitude. Under certain conditions the shielding may be made even thinner and some of the $(9 \pm 2)$ quanta produced on the average in nuclear fission can be utilized for anticoincidence in addition. The average energy of the prompt gamma radiation in fission is $(1.0 \pm 0.2)$ MeV. For the fast fission neutrons the lead shield has no special significance. Inelastic scattering in lead does not remarkably impede the detection probability in the scintillator.

What is claimed is:

1. Apparatus for the non-destructive analysis of nuclear fuels, comprising a body to be inspected and analyzed; a liquid scintillator surrounding such body in spherical symmetry; a plurality of photomultipliers positioned around the circumference of said liquid scintillator; channel means diametrically penetrating said scintillator containing said body; a neutron source means for emitting low-energy neutrons and passing such low-energy neutrons through said channel means to impinge on said body; at least one slot means through said liquid scintillator directed towards said body adapted to collimate the prompt gamma pulses emitted from said body; means for passing said prompt gamma pulses to a gamma detector means; said photomultiplier means being connected in anticoincidence to said gamma detector means.

2. Apparatus as claimed in claim 1, comprising high resolution spectrometers as gamma detector means.

3. Apparatus as claimed in claim 1 in which the neutron channel is coated with a material which absorbs slow neutrons.

4. Apparatus as claimed in claim 1 in which the fuel element body is surrounded by a gamma filter, which is so dimensioned as to absorb substantially all gamma quanta below a predetermined energy limit.

5. Apparatus as claimed in claim 2 wherein said gamma detector or means is a lithium drifted germanium detector means.

6. Apparatus as claimed in claim 3 wherein said material coating is lithium.

7. Apparatus as claimed in claim 1 wherein said body is a nuclear fuel element.

* * * * *

UNITED STATES PATENT OFFICE
CERTIFICATE OF CORRECTION

Patent No. 3,796,875    Dated MARCH 12, 1974

Inventor(s) WALFRIED FRIEDRICH ARTHUR MICHAELIS

It is certified that error appears in the above-identified patent and that said Letters Patent are hereby corrected as shown below:

Page 1, [73] delete "Webeustrasse,"; "Fur" should read -- Für --

Page 1, [30] "5096442" should read -- G 50 964 IXb/42l --.

Column 3, line 22, "transistions" should read -- transitions --.

Signed and sealed this 19th day of November 1974.

(SEAL)
Attest:

McCOY M. GIBSON JR.
Attesting Officer

C. MARSHALL DANN
Commissioner of Patents